United States Patent
Isip, Jr.

(10) Patent No.: US 7,225,206 B2
(45) Date of Patent: May 29, 2007

(54) SYSTEM AND METHOD FOR REORGANIZING STORED DATA

(75) Inventor: Amando B. Isip, Jr., Richardson, TX (US)

(73) Assignee: Computer Associates Think, Inc., Islandia, NY (US)

( * ) Notice: Subject to any disclaimer, the term of this patent is extended or adjusted under 35 U.S.C. 154(b) by 15 days.

(21) Appl. No.: 09/829,164

(22) Filed: Apr. 9, 2001

(65) Prior Publication Data

US 2002/0147736 A1  Oct. 10, 2002

(51) Int. Cl.
  *G06F 17/30* (2006.01)
(52) U.S. Cl. .............. 707/202; 707/200; 707/203; 707/204; 707/205
(58) Field of Classification Search ............. 707/200, 707/204, 202, 100, 201, 203, 205
  See application file for complete search history.

(56) References Cited

U.S. PATENT DOCUMENTS 5,485,608 A * 1/1996 Lomet et al. ............. 707/202
5,565,316 A * 10/1996 Kershaw et al. .......... 706/927
5,721,915 A   2/1998 Sockut et al. ............. 707/200

(Continued)

FOREIGN PATENT DOCUMENTS

WO   WO 00/17787   3/2000

OTHER PUBLICATIONS

Casazza, J.A. An American's view of the reorganisation of the ESI, Power Engineering Journal, V. 11, Issue.2, Apr. 1997, pp. 79-84.*
Zou et al. On-line reorganization of sparsely-populated B+-trees, International Conference of Management of Data, ACM SIGMOD, 1996, pp. 115-124.*

(Continued)

*Primary Examiner*—John E. Breene
*Assistant Examiner*—Baoquoc N. To
(74) *Attorney, Agent, or Firm*—Baker Botts L.L.P.

(57) ABSTRACT

A method for reorganizing data is described. The method includes the steps of reading each record of a source file and writing each record to a destination file. The method also includes the step of creating a log file containing selected log records. Each log record is associated with a change to be made to the destination file. The method further includes the steps of reading each log record of the log file and processing each record of the log file, thereby effecting the associated change to the destination file. The method still further includes the step of replacing the source file with the destination file. An apparatus and article of manufacture are also disclosed for implementing the steps of the method.

37 Claims, 8 Drawing Sheets

U.S. PATENT DOCUMENTS

| | | |
|---|---|---|
| 5,832,508 A | 11/1998 | Sherman et al. ............ 707/200 |
| 6,026,412 A | 2/2000 | Sockut et al. ............... 707/200 |
| 6,070,170 A * | 5/2000 | Friske et al. ................ 707/202 |
| 6,119,128 A * | 9/2000 | Courter et al. .............. 707/202 |
| 6,122,640 A | 9/2000 | Pereira ....................... 707/103 |
| 6,173,292 B1 * | 1/2001 | Barber et al. ............... 707/200 |
| 6,351,744 B1 | 2/2002 | Landresse ....................... 707/8 |
| 6,460,036 B1 * | 10/2002 | Herz ............................. 707/10 |
| 6,775,679 B2 * | 8/2004 | Gupta ......................... 707/102 |
| 6,950,834 B2 * | 9/2005 | Huras et al. ................ 707/202 |
| 6,985,914 B2 * | 1/2006 | Venkatesh et al. .......... 707/200 |
| 7,117,229 B2 * | 10/2006 | Marshall et al. ............ 707/200 |

OTHER PUBLICATIONS

Sockut, et al., *A Method for On-Line Reorganization of a Database*, IBM Systems Journal, vol. 36, No. 3, XP-000701880, pp. 411-436, 1997.

The Patent Office of the People's Republic of China, The First Office Action, for Application No. 02809720.3, 8 pages, Oct. 14, 2005.

European Patent Office Communication for Application No. 02725596.7—PCT/US0211254, 5 pages, Jun. 14, 2006.

* cited by examiner

Figure 1
(Prior Art)

DBMS Log Routine

Figure 2

(Prior Art)

Reorganization Utility - Phase I

Figure 3A
(Prior Art)

Reorganization Utility - Phase II

Figure 3B

(Prior Art)

Figure 4

Reorganization Utility – Phase I

SYSTEM AND METHOD FOR REORGANIZING STORED DATA

TECHNICAL FIELD

The described system and method are generally related to information processing environments and systems and methods for database or file accessing. More specifically, the described system and method are related to systems and methods for improving the reorganization of a tablespace or index.

BACKGROUND

Computers are powerful tools for storing, managing and providing access to vast amounts of information. Computer databases are one common mechanism for storing information on a computer while providing access to users. Common computer implementations of databases store data and indexes in various files or object.

Typically, users do not have direct access to the objects in which the data and/or indexes comprising a database are stored. Users are often provided indirect access to the data and indexes via a database management system ("DBMS"), or an application communicating with a DBMS. A DBMS is responsible for responding to requests from users or applications to change, update, delete and insert data into the physical objects. In this way, the DBMS acts as a buffer between the end-user and the physical data storage mechanism, thereby shielding the end user from having to know or consider the underlying hardware-level details of the table he is using.

There are several common database management systems including, for example, DB2 which employs tablespace and index objects to store and access data. Another example of a common DBMS implementation is IMS which employs database and index objects to store and access data.

In a typical database environment, rows of user data resides in tables which are maintained in data objects such as databases or tablespaces. Each object storing user data may have one or more indexes. Each index facilitates access to rows of the table according to a key. The key of an index is typically data from one or more columns of the table. The rows of data are available to batch and online applications for reading, updating, deleting and inserting new data. When a row of data is inserted or deleted, a corresponding insertion or deletion is performed on all associated indexes. When a key column is updated, all corresponding indexes are also updated.

Typical tables and indexes may include thousands of records. In many DBMS's, all changes, updates, deletions and insertions to the objects are recorded to a log file. The log function is one of the busiest functions in a DBMS due to the large number of records and the high volume of changes being made to objects. A typical DBMS log function also allows for a log exit. Namely, before the DBMS writes each log record, it calls a log exit routine and passes the address of the log record to the routine.

Over time, changes, additions and deletions from a table and/or index may result in an inefficient organization of the stored data, and may affect the ability of the DBMS to timely respond to requests from end-users and applications. To maintain efficient data storage and access, utilities have been developed to reorganize data and index objects. Such utilities may be periodically executed to correct the inefficient organization of data caused by the processing of requests since the last time the reorganization utility was executed. Reorganization utilities are employed periodically because of the time and resources required to perform the reorganization of data.

While a reorganization utility is executing, batch and online applications which require access to the data and/or index objects being reorganized may be executing concurrently. For this reason, reorganization utilities typically examine and reorganize the subject objects in two phases. In the first phase, the subject object is reorganized to account for all changes which have occurred up to the execution of the reorganization utility.

In the second phase, the typical reorganization utility accounts for all changes which have occurred during the execution of the reorganization utility. This is accomplished by reviewing all log file records reflecting changes requested by the concurrent batch and online applications. Before completing the reorganization, the utility processes all of the changes written to the log file, thereby providing an up to date reorganization of the subject data or index object.

Figure 1:
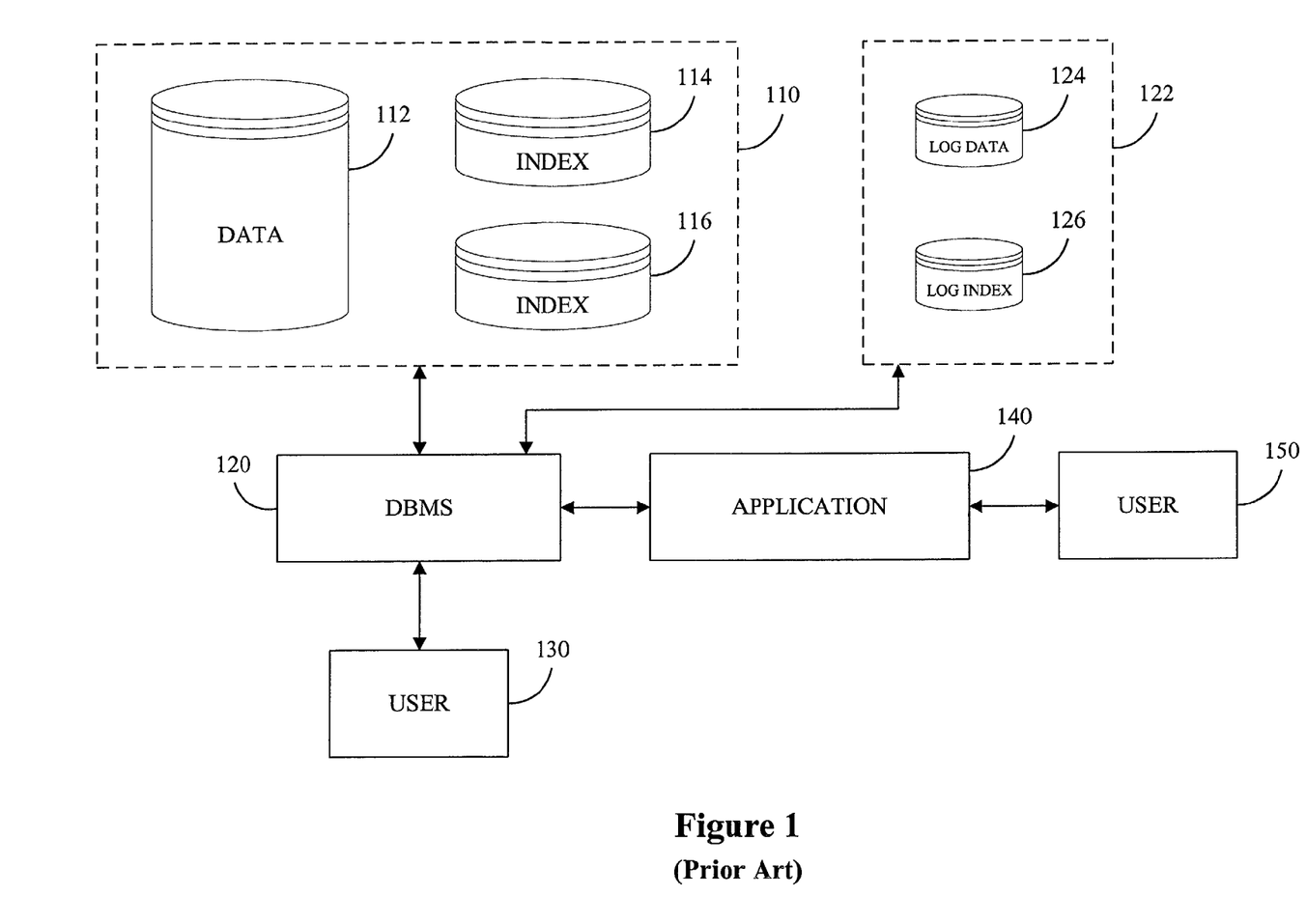
FIG. 1 is a schematic block diagram illustrating a typical DBMS environment.

A typical DBMS environment is illustrated in FIG. 1. As shown, the environment includes a database 110 for maintaining and allowing access to stored information. Database 110 includes at least one data object 112 for storing rows and columns of data. Database 110 preferably includes one or more indexes 114 and 116 associated with data object 112 to assist in accessing the data stored therein. Of course, indexes 114 and 116 are optional, and data object 112 is not required to have any index.

Access to database 110 is provided by Database Management System ("DBMS") 120. DBMS 120 enables user 130 to access database 110. DBMS 120 also enables user 150 to access database 110 indirectly through application 140. DBMS 120 includes routines for reading, adding, deleting and changing the data stored in database 110. DBMS 120 also includes at least one routine for logging all changes made to any object managed by DBMS 120. The logging function may utilize a log database 122 embodied as a data object 124 and an index object 126. In addition to routines for logging changes, DBMS 120 further includes utilities for maintaining the integrity of the data stored in data object 112 and indexes 114 and 116. Certain utilities may be used to rebuild the files or objects within database 110 in the event they become corrupted. Other utilities, specifically a reorganization utility may be used to rearrange the data stored in database 110 for more efficient access. The reorganization utility may operate on data object 112, index 114, index 116, and any combination thereof.

Figure 2:
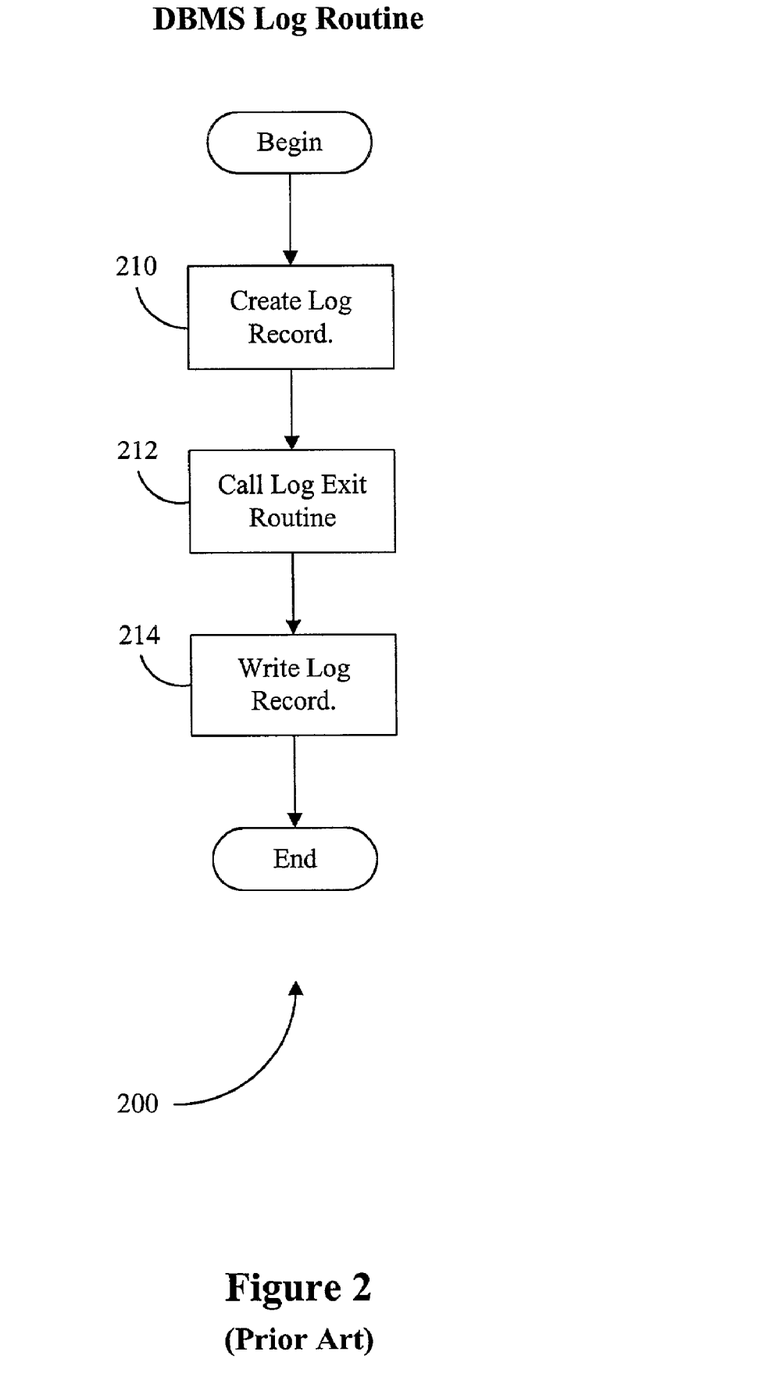
FIG. 2 is a functional flow diagram illustrating the primary steps employed by a conventional DBMS log routine.

Referring now to FIG. 2, there is depicted the steps that a conventional DBMS log routine executes each time a data or index entry is added, deleted or modified. At step 210 a log record is created in a log file. The log file contains changes made by the DBMS to data and/or index objects. The log record identifies the affected data or index object, identifies the record of the affected file and describes the type of activity that resulted in a change to the record. At step 212, a log exit routine is called. The log exit routine is called prior to the writing of the log record, and the address of the log record is passed as part of the call. At step 214, the log record is actually written to the log file.

Figure 3A:
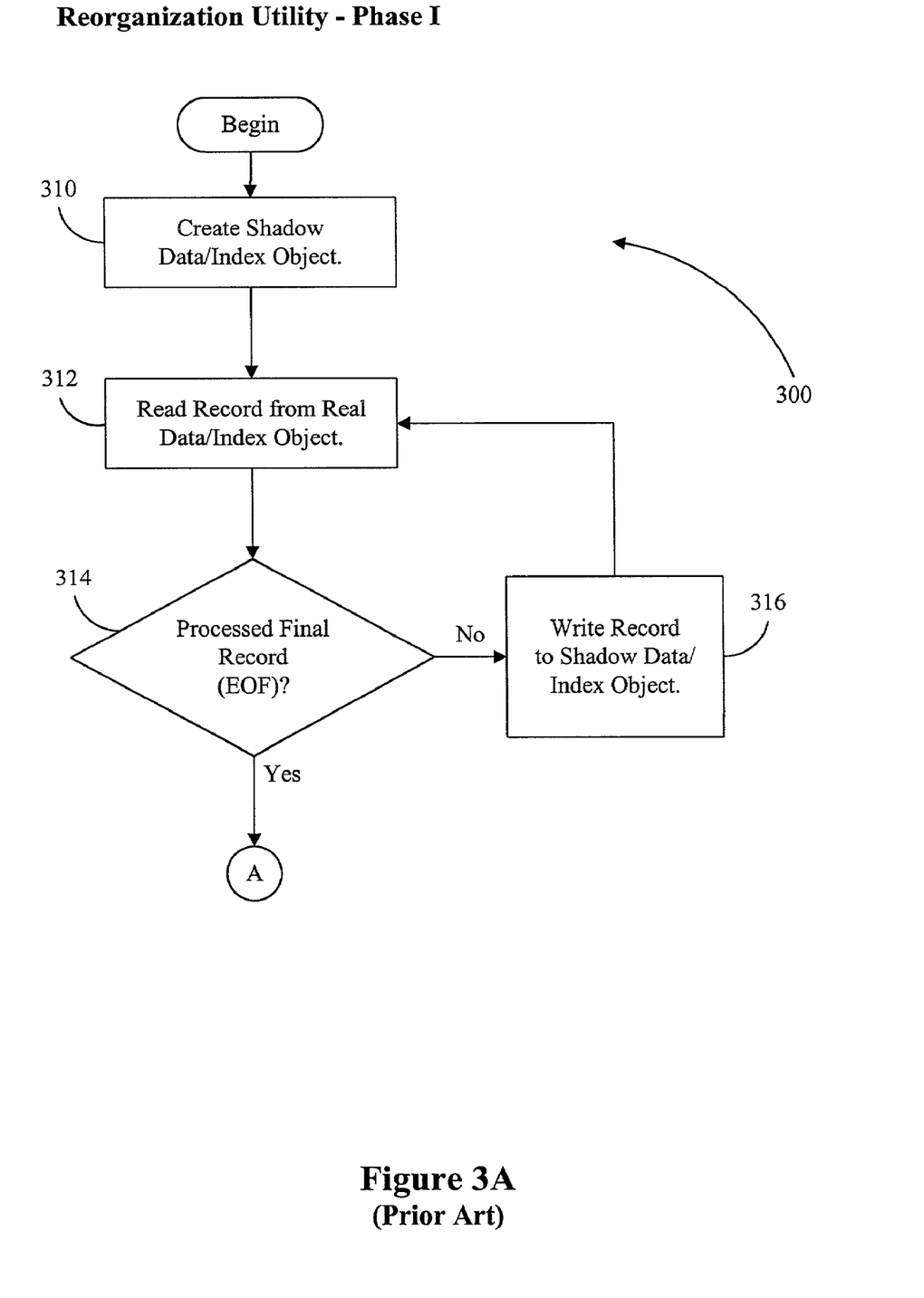
FIGS. 3A–3B are a functional flow diagram illustrating the primary steps typically employed by a conventional reorganization utility.
Figure 3B:
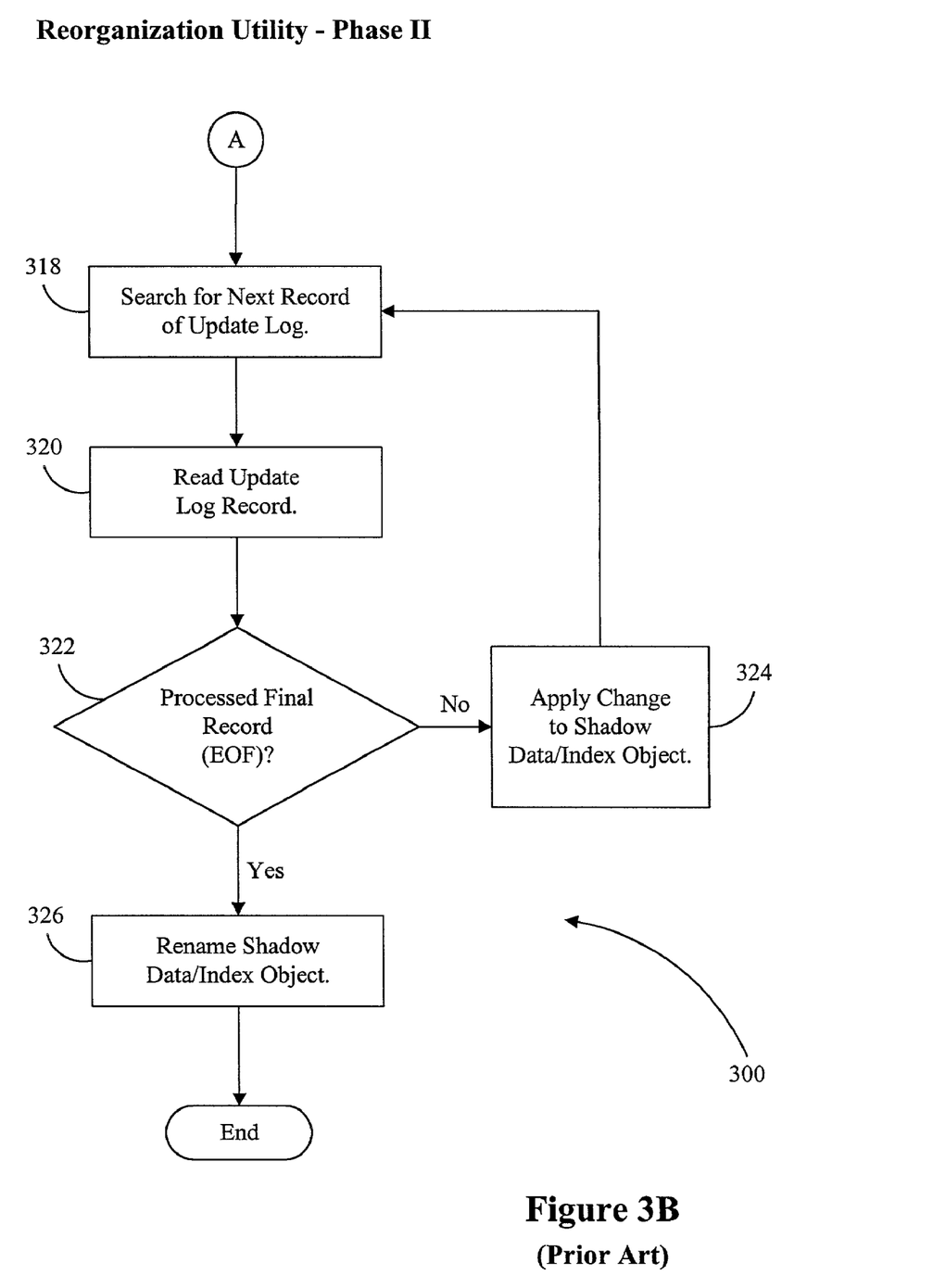

Referring generally to FIGS. 3A and 3B, there is depicted a block diagram illustrating the steps that a conventional reorganization utility performs to more efficiently store data. The steps are collectively referred to by reference numeral 300. Although conventional reorganization utilities may operate on both data and index objects, FIGS. 2, 3A, and 3B are described in terms of reorganizing a data object. Of course, analogous steps are performed when reorganizing an index.

Reorganization utility 300 operates in two phase. During the first phase, depicted in FIG. 3A, the utility individually copies each record from the data object as it exists at the beginning of the reorganization. During the second phase, depicted in FIG. 3B, the reorganization utility accounts for any changes that are made to the data object while processing the first phase. Such changes may be requested by users, online applications or batch applications that require access to the data object concurrently with processing the first phase of the reorganization.

Referring now to FIG. 3A, the steps of the first phase of a conventional reorganization utility are depicted. At step 310, the reorganization utility creates an empty "shadow" data object based on the format of the real data object to be reorganized. Each record of the real data object is read at step 312. As illustrated by decision block 314, if attempting to read a record from the real data object at step 312 results in an End-of-File condition, the reorganization utility begins the second phase of processing. If a record is successfully read at step 312, the record is written to the shadow data object at step 316.

Referring now to FIG. 3B, the steps of the second phase of a conventional reorganization utility are depicted. Upon entering the second phase of processing, at step 318, the reorganization utility searches for the first record in the log file that pertains to a record of the data object being reorganized, where the logged change occurred after the reorganization utility was invoked. In subsequent iterations, step 318 will search for the next record in the log file that pertains to a record of the data object being reorganized. At step 320, the record is read from the log file.

As illustrated by decision block 322, if attempting to read a record from the log file at step 320 results in an End-of-File condition, the reorganization utility completes the reorganization process by performing step 326. If a log file record is successfully read at step 320, the change described by the log file record is applied to the shadow index at step 324, and processing is directed back to step 318. After all concurrent changes to the data object have been applied, the newly reorganized shadow data object is renamed to become the real data object at step 326, thereby allowing access to the reorganized data object.

Consequently, a need exists for an improved method and system for reorganizing data that enables a reorganization utility to operate more efficiently than conventional reorganization utilities. Specifically, a need exists for a method and system that reduces the processing related to effecting changes that are made to a file while it is being reorganized.

SUMMARY

A method for reorganizing data is described. The method includes the steps of reading each record of a source file and writing each record to a destination file. The method also includes the step of creating a log file containing selected log records. Each log record is associated with a change to be made to the destination file. The method further includes the steps of reading each log record of the log file and processing each record of the log file to effect the associated change to the destination file. The method still further includes the step of replacing the source file with the destination file.

A method for logging changes by a database management system is also described. The method includes the steps of identifying a change to be logged and creating a log record based on the change. The method also includes the step of determining whether the change affects a reorganization process. If the change affects the reorganization process, the log record is stored in a first log file. The first log file records only selected changes. The method further includes the step of storing the log record in a second log file. The second log file records all changes.

An first apparatus for reorganizing data is also described. The apparatus includes a means for reading each record of a source file and a means for writing each record to a destination file. The apparatus also includes a means for creating a log file containing selected log records. Each log record is associated with a change to be made to the destination file. The apparatus further includes a means for reading each log record of the log file and a means for processing each record of the log file to effect the associated change to the destination file. The apparatus still further includes a means for replacing the source file with the destination file.

A second apparatus is described for reorganizing data. The second apparatus includes a processor, and a memory connected to the processor. The memory stores a program to control the operation of processor to carry out the steps of the described method for reorganizing data.

An article of manufacture is also described. The article of manufacture is a computer-readable storage medium encoded with processing instructions for implementing the described method for reorganizing data.

The objects, features and advantages of the disclosed method and system are readily apparent from the following description of the preferred embodiments when taken in connection with the accompanying drawings.

BRIEF DESCRIPTION OF THE DRAWINGS

For a more complete understanding of the disclosed method and system and the advantages thereof, reference is now made to the following description taken in conjunction with the accompanying drawings in which like reference numbers indicate like features and wherein.

DETAILED DESCRIPTION

Environment

Figure 4:
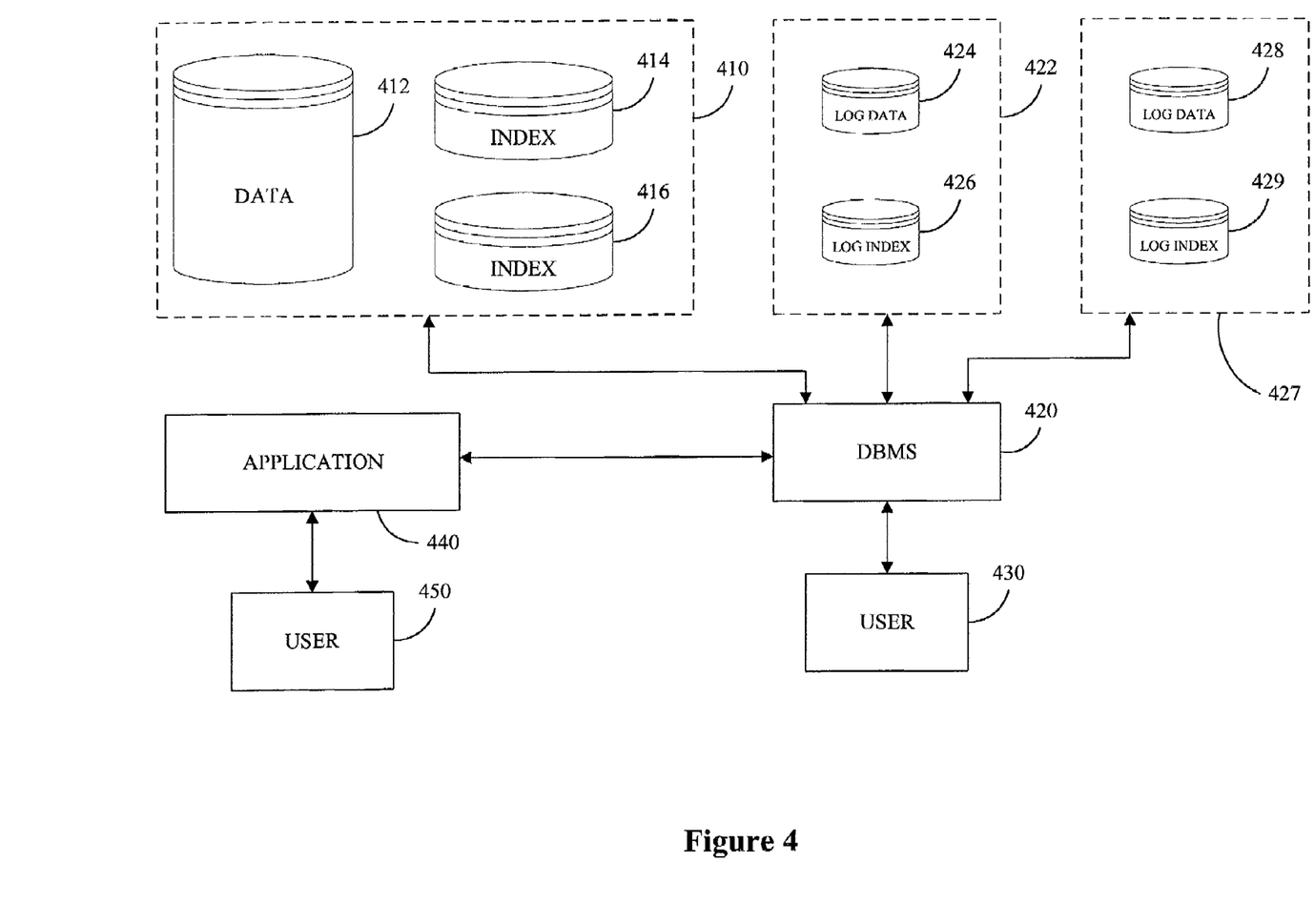
FIG. 4 is a schematic block diagram illustrating the environment of an embodiment of the described method and system.

The disclosed method of reorganizing data preferably operates in an environment such as that illustrated in FIG. 4. As shown, the environment includes a database 410 comprising at least one data object 412 and one or more indexes 414 and 416 associated with data object 412 to assist in accessing the data stored therein. Of course, indexes 414 and 416 are optional, and data object 412 is not required to have any index.

Access to database 410 is provided by Database Management System ("DBMS") 420. DBMS 420 enables user 430 to access database 410. DBMS 420 also enables user 450 to access database 410 indirectly through application 440. DBMS 420 includes routines for reading, adding, deleting and changing the data stored in database 410.

A logging routine of DBMS 420 logs all changes made to any object managed by DBMS 420 in a log database 422 embodied as a data object 424 and an index object 426. In addition to routines for logging changes, DBMS 420 further includes utilities for maintaining the integrity of the data stored in data object 412 and indexes 414 and 416. Certain utilities may be used to rebuild the files or objects within database 410 in the event they become corrupted. Other utilities, specifically a reorganization utility may be used to rearrange the data stored in database 410 for more efficient access. The reorganization utility may operate on data object 412, index 414, index 416, and any combination thereof. The reorganization utility utilizes log database 427 including log data object 428 and log index object 429. Log database 427 stores a subset of changes logged in log database 422.

Figure 5A:
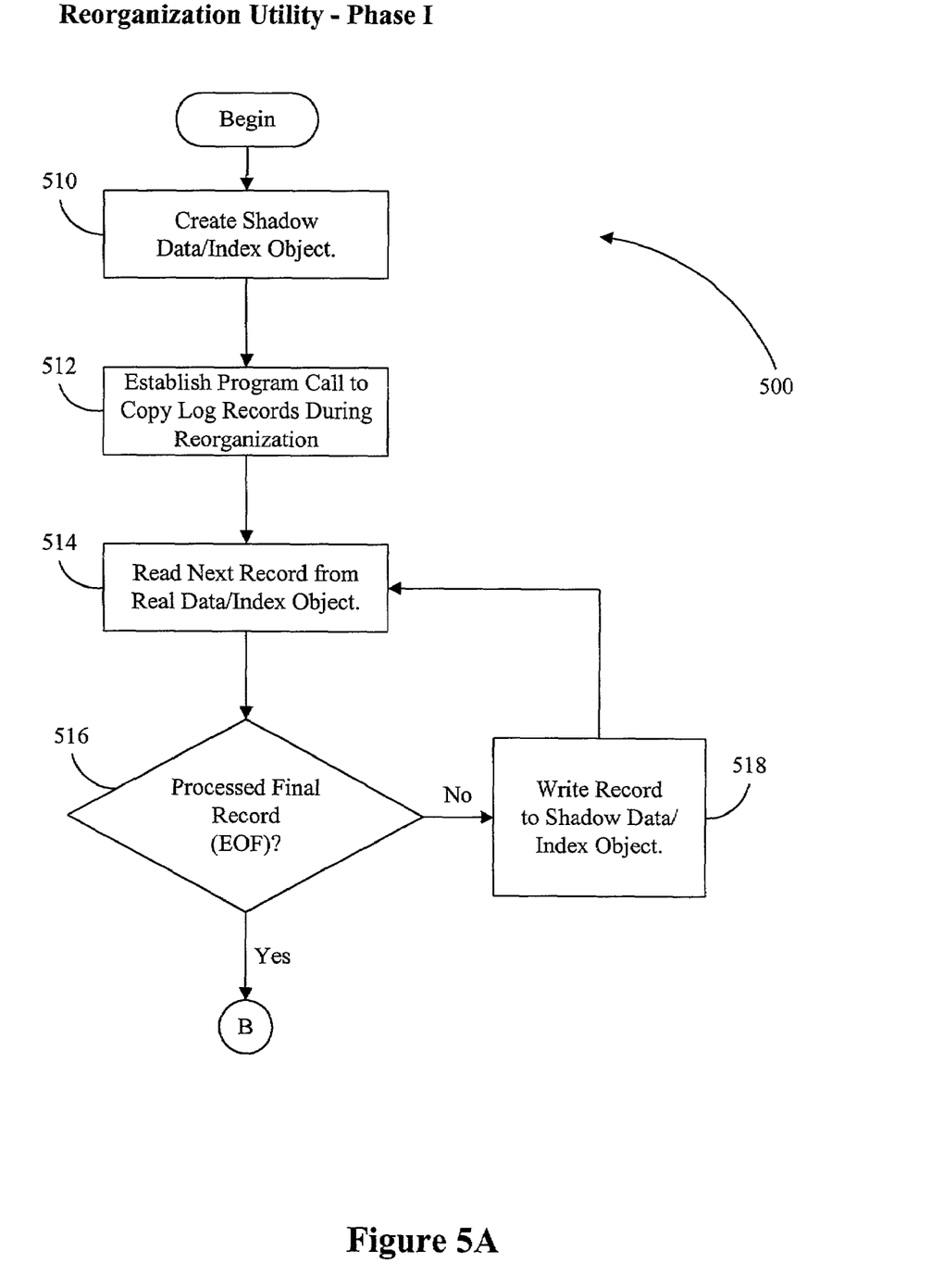
FIGS. 5A–5B are a functional flow diagram illustrating the primary steps of an embodiment of a reorganization utility according to the described reorganization method.
Figure 5B:
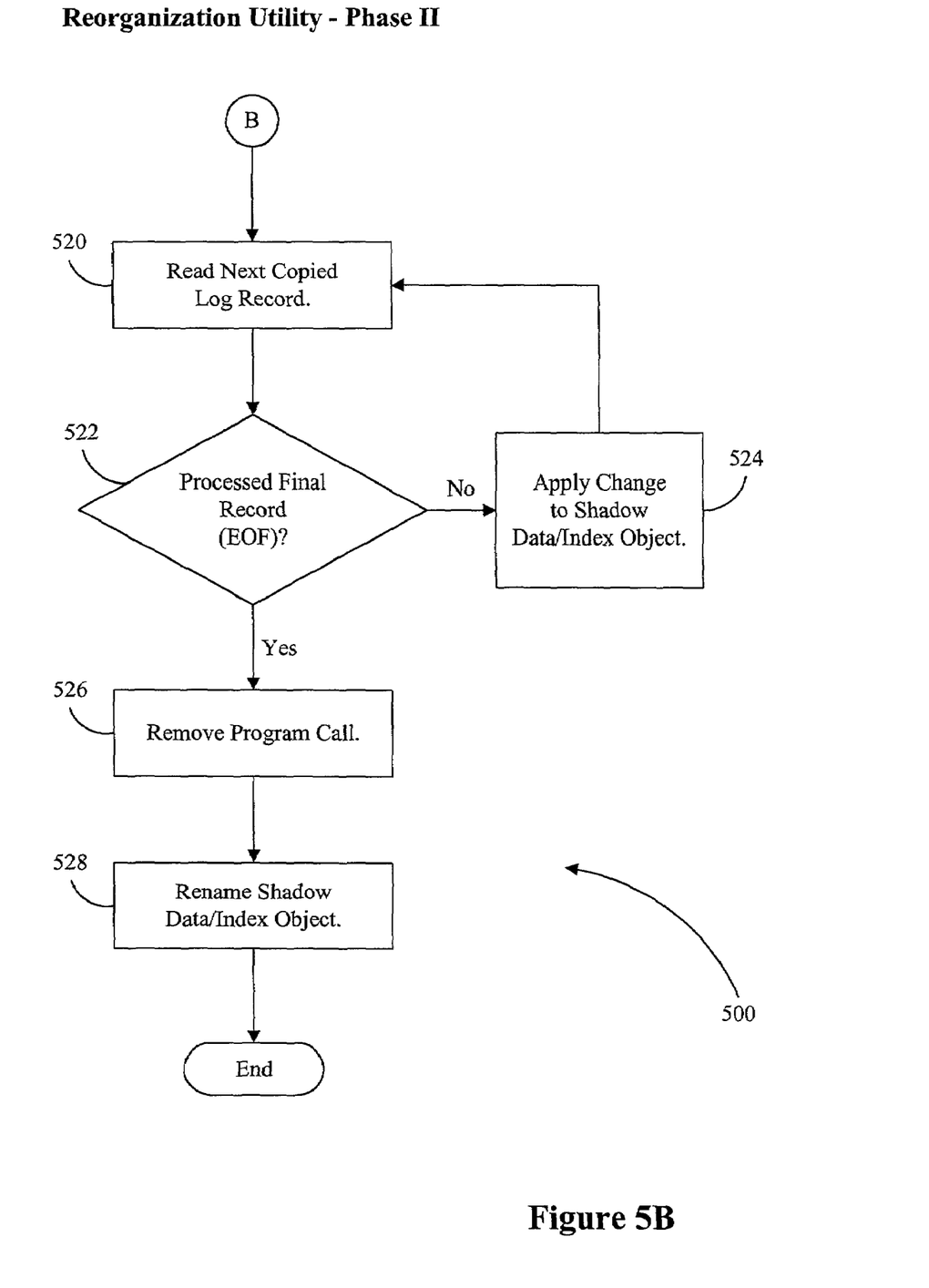
Figure 6:
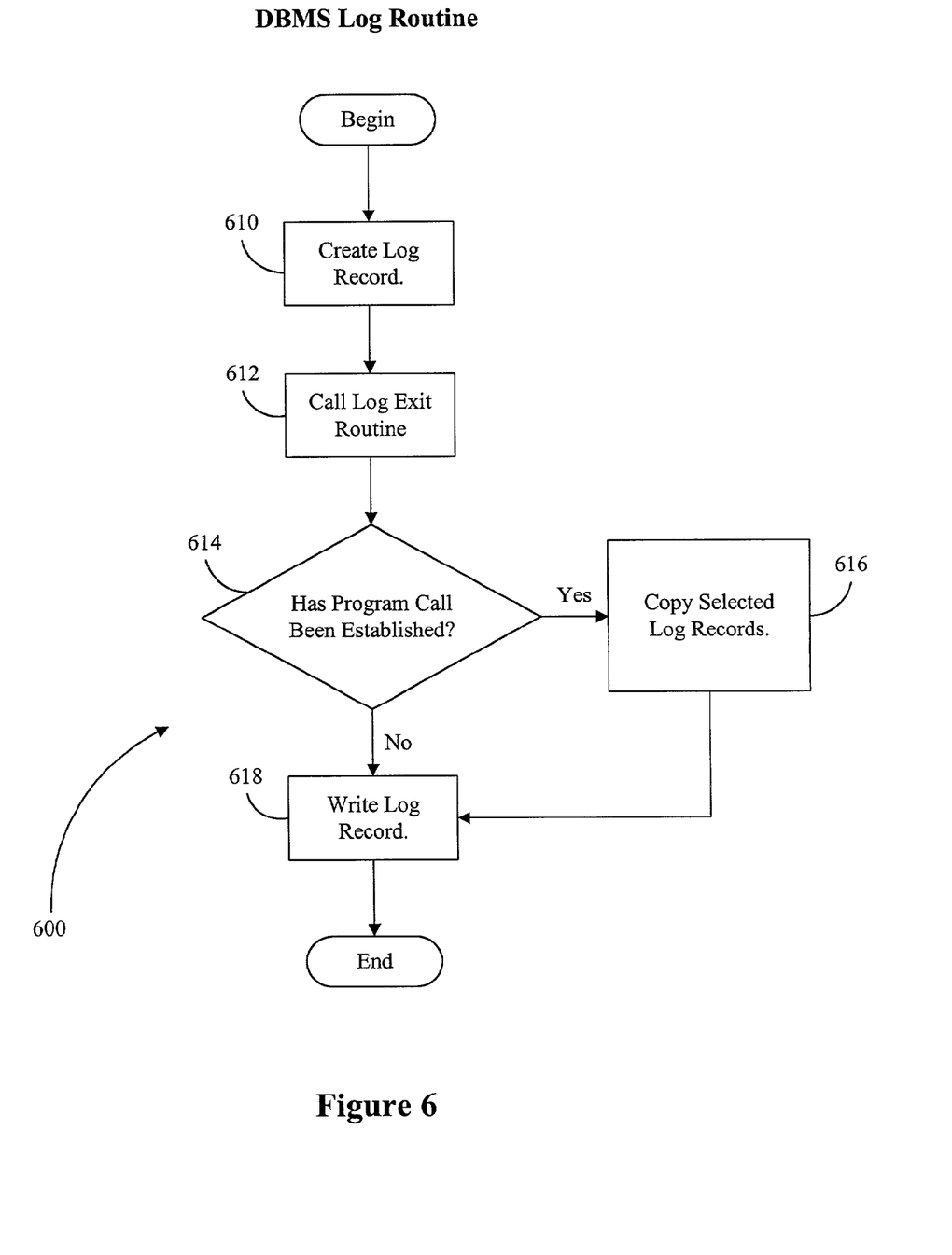
FIG. 6 is a functional flow diagram illustrating the primary steps of an embodiment of a DBMS log routine according to the described reorganization method.

Generally referring now to FIGS. 5A and 5B, there is depicted a block diagram illustrating the steps of one embodiment of a reorganization utility according to the present application. The steps are collectively referred to by reference numeral 500. Although the disclosed reorganization utility may operate on both data and index objects, FIGS. 5A, 5B and 6 are described in terms of reorganizing a data object. Of course, analogous steps are performed when reorganizing an index and are considered to be within the scope of the described method and system.

Improved reorganization utility 500 operates in two phases. During the first phase, depicted in FIG. 5A, the improved reorganization utility establishes a program call to be used by the DBSM log routine and individually copies each record from the data object as it existed at the beginning of the reorganization. During the second phase, depicted in FIG. 5B, the improved reorganization utility utilizes an duplicated subset of log records to account for changes made to the data object during the first phase.

Referring now to FIG. 5A, the steps of the first phase of the improved reorganization utility are depicted. At step 510, the improved reorganization utility creates an empty shadow data object based on the format of the real data object to be reorganized. At step 512, the improved reorganization utility establishes a program call to be used by the DBMS log routine, described in more detail with reference to FIG. 6. The established program call exampines the log records and makes a copy of log records associated with changes to the object being reorganized. These selected log records may be stored to a log file, but are preferably stored in memory to improve the efficiency of the reorganization utility. In the event a threshold is reached in memory utilization, the log records may be stored in DASD. Accordingly, the memory and duplicate log file will only include the log records that are to be processed by the reorganization utility, thereby more efficiently processing the second phase.

Each record of the real data object is read at step 514. As illustrated by decision block 516, if attempting to read a record from the real data object at step 514 results in an End-of-File condition, the improved reorganization utility begins the second phase of processing. If a record is successfully read at step 514, the record is written to the shadow data object at step 518.

Referring now to FIG. 5B, the steps of the second phase of the improved reorganization utility are depicted. Upon entering the second phase of processing, at step 520, the reorganization utility accesses the area in memory and/or the duplicate log file containing the records relevant for the second phase of processing, and reads the first log record. In subsequent iterations, step 520 will read the next record in the log file.

At decision block 522, the improved reorganization utility determines whether step 520 resulted in an End-of-File condition. If so, the reorganization utility continues processing at step 526. If a log file record is successfully read at step 520, the change described by the log file record is applied to the shadow index at step 524, and processing is directed back to step 520. After all logged changes to the data object have been applied, the program call is removed at step 526 and the newly reorganized shadow data object is renamed to become the real data object at step 528, thereby allowing access to the reorganized data object.

Referring now to FIG. 6, there is depicted the steps that an improved DBMS log routine executes each time a data or index entry is added, deleted or modified, according to the described method and system. At step 610 a log record is created in a log file that contains changes made by the DBMS to data and/or index objects. At step 612, a log exit routine is called, and the address of the log record is passed as part of the call. As shown by decision block 614, if the program call has been established by the improved reorganization utility, as previously discussed with reference to step 512 of FIG. 5A, the log routine processes step 616.

At step 616, if the log record represents a change to a file currently being reorganized, the log record is copied to a duplicate log file for use in the second phase of the reorganization. If no program call has been established, or upon completing processing of step 616, the log record is written to the conventional log file at step 618.

From the above description, those skilled in the art will perceive improvements, changes and modifications in the disclosed method and system. Such improvements, changes and modifications within the skill of the art are intended to be covered by the appended claims.

Accordingly, it is to be understood that the drawings and description in this disclosure are proffered to facilitate comprehension of the disclosed method and system, and should not be construed to limit the scope thereof. It should be understood that various changes, substitutions and alterations can be made without departing from the spirit and scope of the disclosed method and system as defined solely by the appended claims.

What is claimed is:

1. A method for logging changes that are made during a reorganization process, comprising:
   reading each record of a source file associated with at least one of a plurality of objects;
   writing each record to a destination file;
   identifying changes to the plurality of objects that are made during a reorganization process;
   for each change, determining whether the change affects an object being reorganized;
   creating, during the reorganization process, a log file comprising log records, wherein the log records are associated with only those changes that are determined to affect an object being reorganized;
   reading each log record of the log file;
   processing each record of the log file to effect the associated change to the destination file;

updating the associated change to the destination file; and
replacing the source file with the destination file.

2. A method according to claim 1 wherein the source file is an index file.

3. A method according to claim 1 wherein the source file is a data file.

4. A method according to claim 1 wherein the step of creating a log file is performed in accordance with instructions of a DBMS log routine.

5. A method according to claim 4 wherein the log file contains a subset of all records processed by the DBMS log routine.

6. A method according to claim 4 wherein the log file records are selected based on a program call established by a reorganization utility.

7. A method according to claim 6 wherein the program call is removed prior to termination of the reorganization utility.

8. A method for logging changes by a database management system, comprising:
  identifying changes to a plurality of objects that are made during a reorganization process;
  creating a log record based on a particular change of the identified changes;
  determining whether the particular change of the identified changes affects one or more of the plurality of objects being reorganized;
  storing the log record in a first log file recording selected changes only if the particular change is determined to affect an object being reorganized; and
  storing the log record in a second log file regardless of whether the change is determined to affect an object being reorganized.

9. A method according to claim 8 wherein the first log file resides in virtual storage.

10. A method according to claim 8 wherein the first log file resides in dataspace.

11. A method according to claim 8 wherein the first log file resides in hyperspace.

12. A method according to claim 8 wherein the first log file resides in DASD.

13. An apparatus for logging changes that are made during a reorganization process, comprising:
  means for reading each record of a source file associated with at least one of a plurality of objects;
  means for writing each record to a destination file;
  means for identifying changes to the plurality of objects that are made during a reorganization process;
  means for determining whether each change affects an object being reorganized;
  means for creating, during the reorganization process, a log file comprising log records, wherein the log records are associated with only those changes that are determined to affect an object being reorganized;
  means for reading each log record of the log file;
  means for processing each record of the log file to effect the associated change to the destination file;
  means for updating the associated change to the destination file; and
  means for replacing the source file with the destination file.

14. An apparatus according to claim 13 wherein the source file is an index file.

15. An apparatus according to claim 13 wherein the source file is a data file.

16. An apparatus according to claim 13 wherein the log file is created in accordance with instructions of a DBMS log routine.

17. An apparatus according to claim 16 wherein the log file contains a subset of all records processed by the DBMS log routine.

18. An apparatus according to claim 16 wherein the log file records are selected based on a program call established by a reorganization utility.

19. An apparatus according to claim 18 wherein the program call is removed prior to termination of the reorganization utility.

20. An apparatus for logging changes that are made during a reorganization process, comprising:
  a processor;
  a memory coupled to said processor and storing a program to control the operation of said processor;
  the processor operative with the program in the memory to:
    read each record of a source file associated with at least one of a plurality of objects;
    write each record to a destination file;
    identify changes to the plurality of objects that are made during a reorganization process;
    for each change, determine whether the change affects an object being reorganized;
    create during the reorganization process a log file comprising log records, wherein the log records are associated with only those changes that are determined to affect an object being reorganized;
    read each log record of the log file;
    process each record of the log file to effect the associated change to the destination file;
    update the associated change to the destination file; and
    replace the source file with the destination file.

21. An apparatus according to claim 20 wherein the source file is an index file.

22. An apparatus according to claim 20 wherein the source file is an data file.

23. An apparatus according to claim 20 wherein the processor is further operative with the program in the memory to create the log file in accordance with instructions of a DBMS log routine.

24. An apparatus according to claim 23 wherein the log file contains a subset of all records processed by the DBMS log routine.

25. An apparatus according to claim 20 wherein the processor is further operative with the program in the memory to select the log file records based on a program call established by a reorganization utility.

26. An apparatus according to claim 23 wherein the processor is further operative with the program in the memory to remove the program call prior to termination of the reorganization utility.

27. A computer-readable storage medium encoded with processing instructions for implementing a method for logging changes that are made during a reorganization process, the processing instructions executed by a processor for directing a computer to perform the steps of:
  reading each record of a source file associated with at least one of a plurality of objects;
  writing each record to a destination file;
  identifying changes to the plurality of objects that are made during a reorganization process;
  for each change, determining whether the change affects an object being reorganized;

creating, during the reorganization process, a log file comprising log records, wherein the log records are associated with only those changes that are determined to affect an object being reorganized;

reading each log record of the log file;

processing each record of the log file to effect the associated change to the destination file;

updating the associated change to the destination file; and replacing the source file with the destination file.

28. A method for logging changes that are made during a reorganization process, comprising:

creating an empty destination file;

establishing a program call to process log records;

reading each record of a source file associated with at least one of a plurality of objects;

writing each record to the destination file;

identifying changes to the plurality of objects that are made during a reorganization process;

for each change, determining whether the change affects an object being reorganized;

employing the established program call to create during the reorganization process a log file comprising log records, wherein the log records are associated with only those changes that are determined to affect an object being reorganized;

removing the established program call;

reading each log record of the log file;

processing each record of the log file to effect the associated change to the destination file;

updating the associated change to the destination file; and replacing the source file with the destination file.

29. A method according to claim 28 wherein the source file is an index file.

30. A method according to claim 28 wherein the source file is a data file.

31. An apparatus for logging changes that are made during a reorganization process, comprising:

means for creating an empty destination file;

means for establishing a program call to process log records;

means for reading each record of a source file associated with at least one of a plurality of objects;

means for writing each record to the destination file;

mean for identifying changes to the plurality of objects that are made during a reorganization process;

means for determining whether each change affects an object being reorganized;

means for employing the established program call to create during the reorganization process a log file comprising log records, wherein the log records are associated with only those changes that are determined to affect an object being reorganized;

means for removing the established program call;

means for reading each log record of the log file;

means for processing each record of the log file to effect the associated change to the destination file;

means for updating the associated change to the destination file; and means for replacing the source file with the destination file.

32. An apparatus according to claim 31 wherein the source file is an index file.

33. An apparatus according to claim 31 wherein the source file is a data file.

34. An apparatus for logging changes that are made during a reorganization process, comprising:

a processor;

a memory coupled to said processor and storing a program to control the operation of said processor;

the processor operative with the program in the memory to:

create an empty destination file;

establish a program call to process log records;

read each record of a source file associated with at least one of a plurality of objects;

write each record to the destination file;

identify changes to the plurality of objects that are made during a reorganization process;

for each change, determine whether the change affects an object being reorganized;

employ the established program call to create during the reorganization process a log file comprising log records, wherein the log records are associated with only those changes that are determined to affect an object being reorganized;

remove the established program call;

read each log record of the log file;

process each record of the log file to effect the associated change to the destination file;

updating the associated change to the destination file; and replace the source file with the destination file.

35. An apparatus according to claim 34 wherein the source file is an index file.

36. An apparatus according to claim 34 wherein the source file is a data file.

37. A computer-readable storage medium encoded with processing instructions for implementing a method for logging changes that are made during a reorganization process, the processing instructions executed by a processor for directing a computer to perform the steps of:

creating an empty destination file;

establishing a program call to process log records;

reading each record of a source file associated with at least one of a plurality of objects;

writing each record to the destination file;

identifying changes to the plurality of objects that are made during a reorganization process;

for each change, determining whether the change affects an object being reorganized;

employing the established program call to create during the reorganization process a log file comprising log records, wherein the log records are associated with only those changes that are determined to affect an object being reorganized;

removing the established program call;

reading each log record of the log file;

processing each record of the log file to effect the associated change to the destination file;

updating the associated change to the destination file; and replacing the source file with the destination file.

* * * * *